(12) United States Patent
Klose et al.

(10) Patent No.: US 11,447,037 B2
(45) Date of Patent: Sep. 20, 2022

(54) SYSTEM AND METHOD FOR REGULATING A CHARGING TEMPERATURE OF A VEHICLE BATTERY

(71) Applicant: KLOSE & OECHSLE GMBH, Düsseldorf (DE)

(72) Inventors: Alexander Klose, Reutlingen (DE); Oliver Oechsle, Düsseldorf (DE)

(73) Assignee: Klose & Oechsle GmbH, Duesseldorf (DE)

( * ) Notice: Subject to any disclaimer, the term of this patent is extended or adjusted under 35 U.S.C. 154(b) by 156 days.

(21) Appl. No.: 16/769,303

(22) PCT Filed: Dec. 4, 2018

(86) PCT No.: PCT/EP2018/083460
§ 371 (c)(1),
(2) Date: Jun. 3, 2020

(87) PCT Pub. No.: WO2019/110576
PCT Pub. Date: Jun. 13, 2019

(65) Prior Publication Data
US 2021/0188127 A1 Jun. 24, 2021

(30) Foreign Application Priority Data
Dec. 4, 2017 (DE) .......................... 102017221829.0

(51) Int. Cl.
*B60L 58/26* (2019.01)
*H01M 10/613* (2014.01)
(Continued)

(52) U.S. Cl.
CPC ............... *B60L 58/26* (2019.02); *B60L 53/11* (2019.02); *B60L 53/62* (2019.02);
(Continued)

(58) Field of Classification Search
CPC .......... B60L 58/26; B60L 53/11; B60L 53/62; B60L 58/27; B60L 2240/545;
(Continued)

(56) References Cited

U.S. PATENT DOCUMENTS

2014/0012447 A1* 1/2014 Gao ........................ B60L 58/26
701/22
2014/0121866 A1 5/2014 Dangler et al.
(Continued)

FOREIGN PATENT DOCUMENTS

DE 102017121371 A1 3/2018
EP 2 177 389 A1 4/2010
(Continued)

OTHER PUBLICATIONS

International Search Report corresponding to international application No. PCT/EP2018/083460 dated May 24, 2019, (18 pages).

*Primary Examiner* — Paul Dinh
(74) *Attorney, Agent, or Firm* — Maginot, Moore & Beck, LLP

(57) ABSTRACT

System for regulating a charging temperature (T) of a vehicle battery (2) of a vehicle, wherein the vehicle battery (2) is cooled by means of a fluid (F) which circulates in a cooling circuit (21) of the vehicle, which is controlled by a controller (18) such that, upon reaching a charging station, the temperature of the vehicle battery (2) is pre-controlled to a desired charging start temperature ($T_0$) which is suitable for an electrical charging procedure for speedily charging the vehicle battery (2) by means of the charging station.

14 Claims, 5 Drawing Sheets

(51) Int. Cl.
*H01M 10/625* (2014.01)
*B60L 53/62* (2019.01)
*B60L 53/10* (2019.01)
*H02J 7/00* (2006.01)

(52) U.S. Cl.
CPC ....... *H01M 10/613* (2015.04); *H01M 10/625* (2015.04); *H02J 7/00309* (2020.01)

(58) Field of Classification Search
CPC ............ B60L 2260/56; H01M 10/613; H01M 10/625; H01M 10/615; H01M 10/663; H01M 2010/4278; H01M 10/425; H01M 10/6556; H01M 10/486; H02J 7/00309; Y02E 60/10; Y02T 10/70; Y02T 10/7072; Y02T 90/12; Y02T 90/14
USPC ......................................................... 320/109
See application file for complete search history.

(56) References Cited

U.S. PATENT DOCUMENTS

2018/0304765 A1* 10/2018 Newman .................. B60L 58/26
2020/0076020 A1* 3/2020 Ogaki ................... H01M 10/63

FOREIGN PATENT DOCUMENTS

| EP | 2 529 979 A1 | 12/2012 |
| JP | 2016220310 A | 12/2016 |
| WO | 2018009448 A1 | 1/2018 |

* cited by examiner

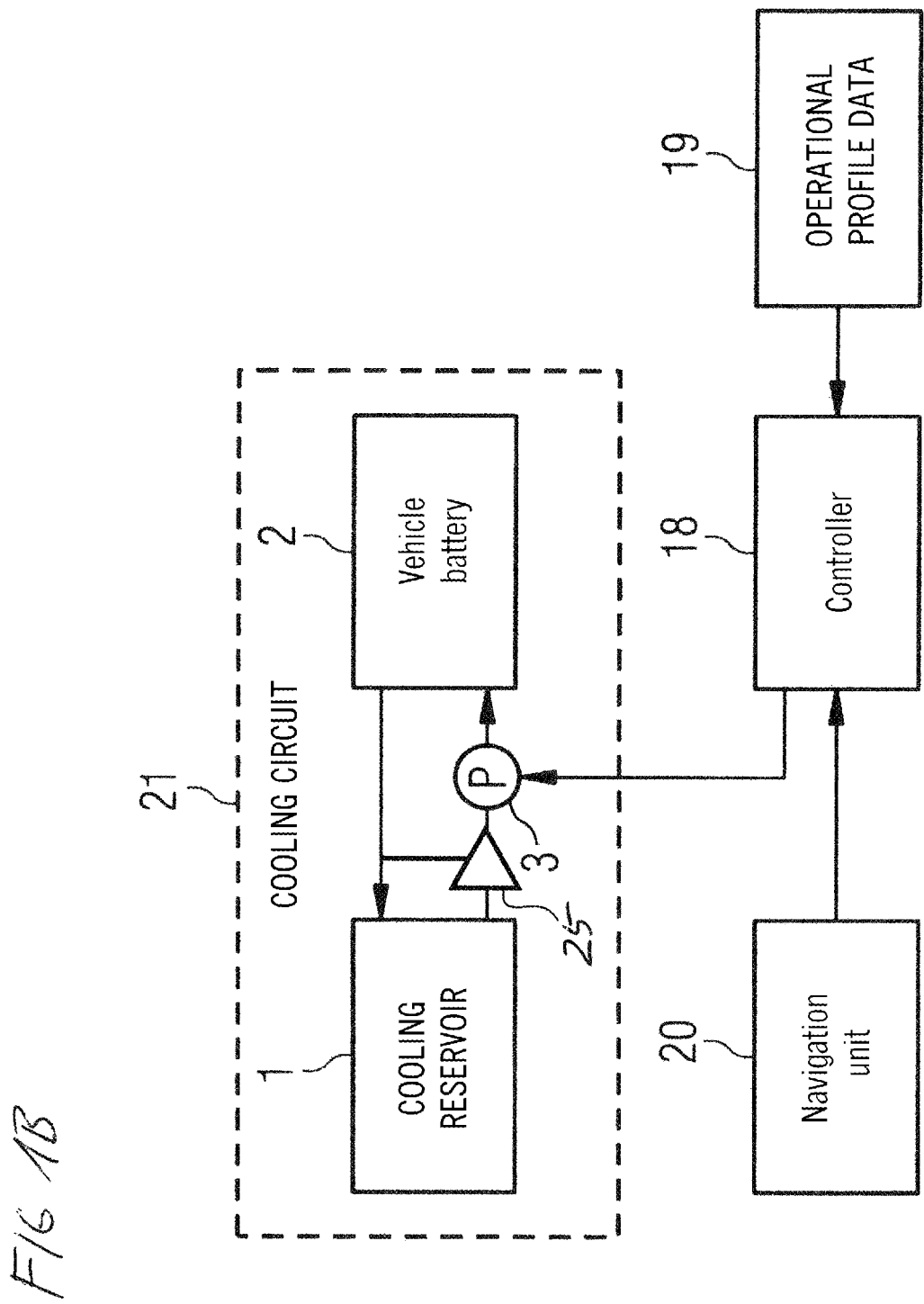

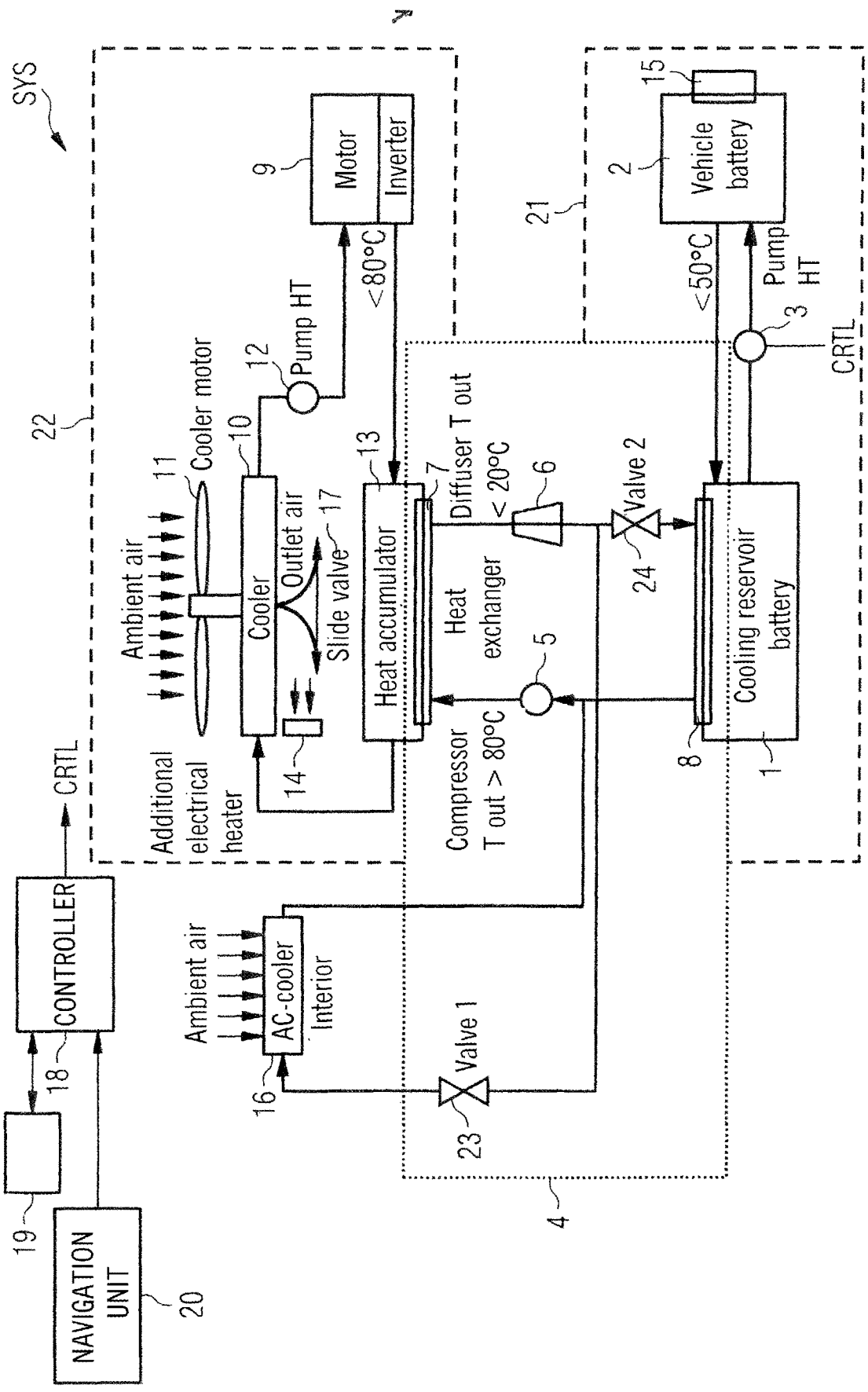

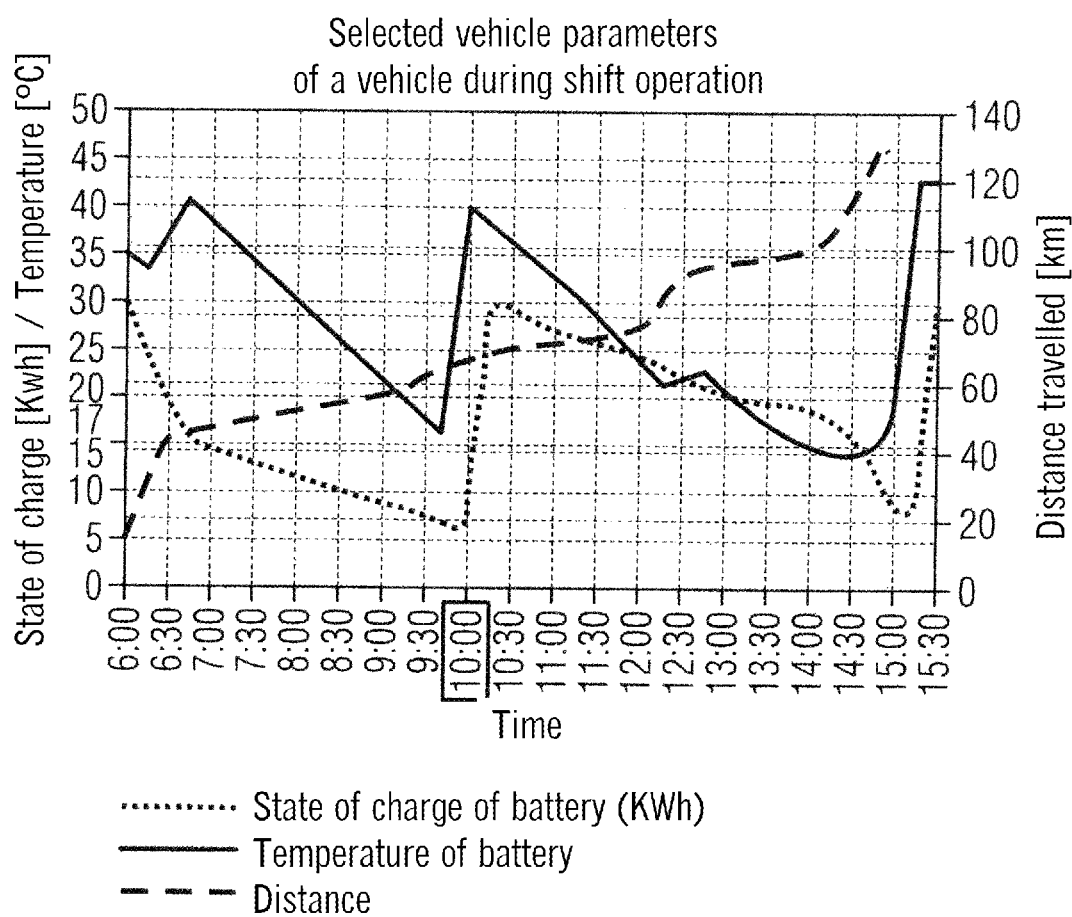

SYSTEM AND METHOD FOR REGULATING A CHARGING TEMPERATURE OF A VEHICLE BATTERY

This application is a 35 U.S.C. 371 National Stage application of PCT/EP2018/083460, filed Dec. 4, 2018, and claims priority to German Application No. De 102017221829.0 filed on Dec. 4, 2017. The entire contents of the above-mentioned patent applications are incorporated herein by reference as part of the disclosure of this U.S. application.

The invention relates to a system and a method for optimising and regulating a charging temperature of a vehicle battery of a vehicle, and in particular to a system and a method for actively regulating a charging temperature of a vehicle battery by means of a temperature sink for optimising a range of the vehicle and/or for speeding up a charging procedure of the vehicle battery.

Electric vehicles have an electric motor which is powered by a vehicle battery during travel. When designing electric vehicles, the battery capacity and power of the vehicle battery play a significant role. A user of the electric vehicle would like the electric vehicle to have the longest possible range whilst at the same time the shortest possible charging times for charging the vehicle battery. Conventional vehicle batteries permit, depending upon electrochemical composition, charging currents between 1 and 20 times the battery capacity of the vehicle battery, which is also referred to as the C-value. During charging of the battery, electrical currents flow and generate heat in the vehicle battery. High charging currents can result in heat generation which can heat the vehicle battery beyond a permissible temperature value. For example, conventional lithium-ion vehicle batteries are not to be heated above 50° C. Therefore, in order to avoid significant heating of vehicle batteries the battery cells of the vehicle battery which are installed in the vehicle are in part actively cooled. This temperature cooling is effected e.g. by means of an air flow or by means of a cooling liquid. US 2017/0096073 A1 describes a vehicle, in which the vehicle battery is cooled during a charging procedure by means of an externally supplied cooling liquid. DE 11 2013 004 048 describes a thermal management system for an electric vehicle, in which, inter alia, the temperature of the vehicle battery is actively regulated. DE 10 2016 109 590 describes a traction battery cooling system, in which likewise the temperature of the vehicle battery is actively regulated. In both conventional systems, the waste heat is output to the environment. Moreover, in order to increase the cooling power a cooling unit can be used in these conventional systems.

Conventional systems aim to maintain the temperature of the vehicle battery within a desired temperature range at the time of operation and of the charging procedure and to discharge the generated heat, where necessary. The system described in this invention absorbs the charging heat, which is generated by the vehicle battery at the time of the charging procedure, with the aid of the fluid mass of a coolant circuit for the vehicle battery. As a result, it is possible to store the charging heat of the vehicle battery and to maintain the temperature of the vehicle battery within a desired temperature range during the charging procedure. If it becomes necessary to heat the vehicle battery, the coolant for the vehicle battery can be heated by a heating apparatus and/or the stored waste heat from the charging procedure can be used.

During a very rapid charging procedure, e.g. during a charging time of less than 20 minutes, depending upon the electrochemical composition of the vehicle battery and the design thereof, a relatively large amount of waste heat of several kilowatts of power and several kilowatt-hours of energy is produced. Therefore, with a reduced charging time the cooling power for cooling the vehicle battery must be increased disproportionately in conventional systems because, on the one hand, the heat energy quantity generated during charging increases and at the same time the charging time is reduced. In order to discharge the resulting heat quantity, a relatively high cooling power is required which also causes an increase in heat in the area directly surrounding the vehicle and at the same time produces increasing noise in the cooling fan. A further disadvantage of conventional systems is that active temperature regulation of the vehicle battery is effected only during the charging procedure and therefore the charging procedure of the vehicle battery always requires a considerable charging time or the speed of the charging procedure is limited by compliance with the maximum temperature of the battery.

Therefore, it is an object of the present invention to provide a method and a system for regulating a charging temperature of a vehicle battery of a vehicle, in which the charging procedure for electrically charging the vehicle battery is sped up or the required charging time for charging the vehicle battery is reduced.

According to a first aspect of the invention, this object is achieved by a system for regulating a charging temperature of a vehicle battery of a vehicle having the features stated in claim 1.

Accordingly, the invention provides a system for regulating a charging temperature of a vehicle battery of a vehicle, wherein the vehicle battery is cooled by means of a fluid which circulates in a cooling circuit of the vehicle, which is controlled by a controller such that, upon reaching a charging station, the temperature of the vehicle battery is pre-controlled to a desired charging start temperature which is suitable for an electrical charging procedure for speedily charging the vehicle battery by means of the charging station.

The pre-temperature-controlled fluid can circulate completely in the cooling circuit of the vehicle battery or alternatively can be admixed in a secondary circuit.

The system in accordance with the invention results in a more rapid charging procedure in a vehicle battery in an electric vehicle which discharges and intermediately stores the waste heat produced by a fluid. Depending upon the operating profile of the vehicle and the outside temperature, the stored heat quantity can be used for controlling the temperature of an interior of a vehicle in order thereby to extend the range of the vehicle in spite of the operation of a heater for the interior. Alternatively, the generated heat quantity can be output to the area surrounding the vehicle over the period of operation, without reducing the range of the vehicle.

By reason of the efficient option of actively discharging the waste heat of the vehicle battery, a thermally insulated design of the vehicle battery is recommended. This is advantageous especially in the case of cold ambient temperatures in order to not allow the temperature of the vehicle battery to fall below a desired temperature and not to have to use any valuable electrical energy for a heating procedure.

In the case of one possible embodiment of the system in accordance with the invention, the controller of the system determines an expected remaining duration and/or remaining distance until the vehicle reaches the charging station and any resulting heat currents, to be expected, of vehicle components of the vehicle until the vehicle reaches the charging station.

In the case of one possible embodiment of the system in accordance with the invention, the controller calculates the expected remaining duration and/or the expected remaining distance until the charging station is reached on the basis of navigation data provided by a navigation unit of the vehicle, and/or on the basis of operational profile data of the vehicle.

In the case of one possible embodiment of the system in accordance with the invention, the operational profile data of the vehicle are recorded and periodically stored in a data memory of the system.

In the case of a further possible embodiment of the system in accordance with the invention, the controller monitors a current state of charge and an operating temperature of the vehicle battery.

In the case of a further possible embodiment of the system in accordance with the invention, the controller activates the cooling circuit and/or a battery heater provided on the vehicle battery in terms of the heat currents to be expected until the charging station is reached such that the monitored operating temperature of the vehicle battery on reaching the charging station corresponds to the desired charging start temperature.

In the case of a further possible embodiment of the system in accordance with the invention, the vehicle battery is installed in a thermally insulated installation space within the vehicle which is cooled by means of the fluid circulating within the cooling circuit.

In the case of a further possible embodiment of the system in accordance with the invention, the cooling circuit has a tank for holding a specified quantity of the fluid and a pump, which can be controlled by the controller, for pumping the fluid through the installation space of the vehicle battery.

In the case of a further possible embodiment of the system in accordance with the invention, the quantity of the fluid within the tank can, for the most part, absorb the heat quantity accumulating during the electrical charging procedure of the vehicle battery.

In the case of a further possible embodiment of the system in accordance with the invention, the quantity of the fluid within the installation space can be freely dimensioned between the individual battery cells.

In the case of a further possible embodiment of the system in accordance with the invention, the fluid located in the tank of the cooling circuit is pre-cooled to a low temperature prior to the beginning of the electrical charging procedure and is pumped by means of a pump through the installation space of the vehicle battery at the beginning of the electrical charging procedure.

In the case of a further possible embodiment of the system in accordance with the invention, the waste heat produced during the electrical charging procedure of the vehicle battery is used to control the temperature of a passenger compartment of the vehicle and/or other vehicle components of the vehicle.

In the case of a further possible embodiment of the system in accordance with the invention, the waste heat produced during the electrical charging procedure of the vehicle battery is intermediately stored via a heat pump, which is coupled to the cooling circuit, in a heat accumulator of a high temperature circuit of a drive train of the vehicle.

In the case of a further possible embodiment of the system in accordance with the invention, the high temperature circuit of the vehicle has a pump, which can be controlled by the controller, for pumping a fluid through the drive train and through the heat accumulator and through heating devices for a passenger compartment of the vehicle or for other vehicle components of the vehicle.

In the case of a further possible embodiment of the system in accordance with the invention, the quantity of the fluid circulating within the cooling circuit is dimensioned such that a maximum permissible temperature of the vehicle battery is not reached during an electrical charging of the vehicle battery from about 10% of its battery charging capacity at the beginning of the electrical charging procedure to about 80% of its battery charging capacity at the end of the electrical charging procedure.

In the case of a further possible embodiment of the system in accordance with the invention, the controller for setting the cooling power provided by the cooling circuit activates the power of a pump contained in the cooling circuit and/or a compressor contained in a heat pump.

The invention further provides, according to a further aspect, a method for regulating a charging temperature of a vehicle battery of a vehicle comprising the features stated in claim 15.

Accordingly, the invention provides a method for regulating a charging temperature of a vehicle battery of a vehicle, wherein the vehicle battery is cooled by means of a fluid which circulates in a cooling circuit of the vehicle which is controlled such that, upon reaching a charging station, the temperature of the vehicle battery is pre-controlled to a desired charging start temperature which is suitable for an electrical charging procedure for speedily charging the vehicle battery by means of the charging station.

Possible embodiments of the system in accordance with the invention and of the method in accordance with the invention for regulating a charging temperature of a vehicle battery of a vehicle are described in more detail hereinafter with reference to the attached figures.

In the drawings:

FIG. 1B shows a modification of the block diagram shown in FIG. 1A which additionally permits a secondary current circuit for mixing the fluid from the battery return with the temperature-controlled fluid from the tank;

FIG. 2 shows a further block diagram to illustrate one possible embodiment of an inventive system for regulating a charging temperature of a vehicle battery;

FIG. 4 shows functional diagrams to explain the mode of operation of the system in accordance with the invention and of the method in accordance with the invention by reference to an exemplified embodiment.

Figure 1A:
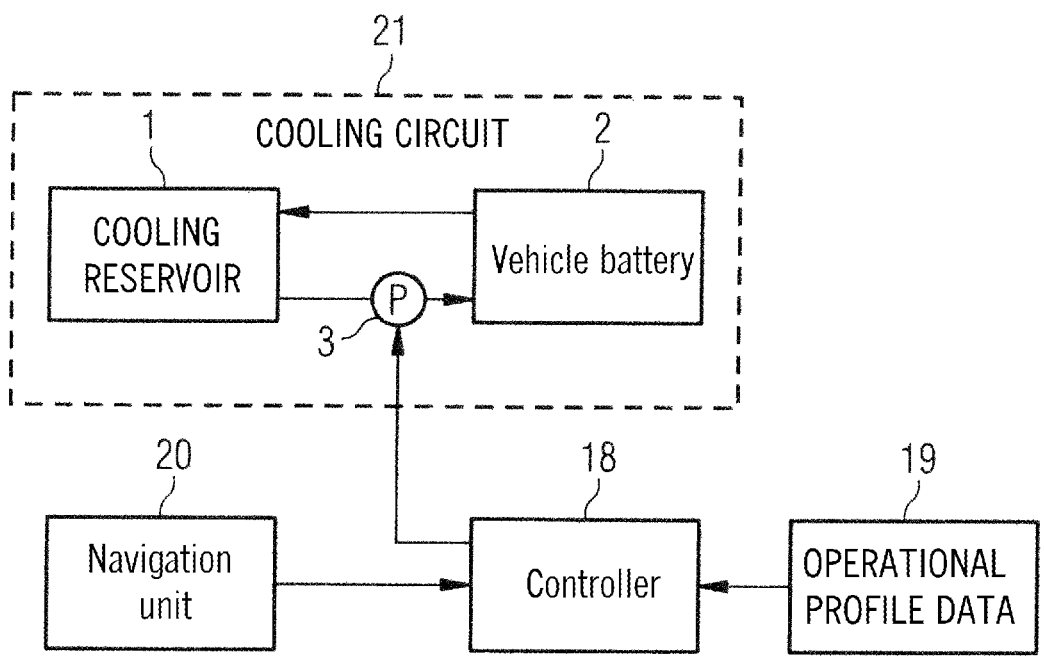
FIG. 1A shows a block diagram to illustrate one possible embodiment of an inventive system for regulating a charging temperature of a vehicle battery of a vehicle.

The system (SYS) illustrated in FIG. 1A serves to regulate a charging temperature of a vehicle battery of a vehicle, in particular an electric vehicle. In the case of the exemplified embodiment illustrated in FIG. 1A, a vehicle battery 2 of a vehicle is coupled to a cooling reservoir or tank 1. The tank 1 illustrated in FIG. 1A forms a holding container for holding a fluid F. This fluid F is pumped by means of a pump 3 for cooling the vehicle battery 2 within a cooling circuit 21. The vehicle battery 2 is cooled by means of the fluid F which circulates in the cooling circuit 21 of the vehicle. The cooling circuit 21 of the vehicle is controlled by a controller 18 of the system SYS such that, upon reaching a charging station, the temperature of the vehicle battery 2 is pre-controlled to a desired charging start temperature $T_0$. This desired charging start temperature $T_0$ is suitable for an electrical charging procedure for speedily charging the vehicle battery 2 by means of the charging station. The desired charging start temperature $T_0$ depends upon the electrochemical composition and upon the individual design of the vehicle battery 2 of the vehicle. In the case of one possible embodiment, the desired charging start temperature $T_0$ is preferably about 20° C., e.g. 17° C. In the case of the exemplified embodiment illustrated in FIG. 1A, the pump 3 is activated by means of a controller 18 of the system SYS. In the case of the embodiment illustrated in FIG. 1A, the controller 18 can determine an expected remaining duration and/or remaining distance until the charging station is reached and any resulting heat currents, to be expected, of vehicle components of the vehicle until the vehicle reaches the charging station.

In the case of the exemplified embodiment illustrated in FIG. 1A, the controller 18 is connected to a navigation unit 20 of the vehicle. In the case of one possible embodiment, the controller 18 calculates the expected remaining duration and/or the expected remaining distance until the charging station is reached, on the basis of navigation data and on the basis of operational profile data of the vehicle. In the case of the embodiment illustrated in FIG. 1A, the navigation unit 20 provides navigation data to the controller 18, on the basis of which the expected remaining duration and/or the expected remaining distance until the charging station is reached is calculated. Furthermore, during the calculation of the remaining duration and/or the remaining distance to be expected, operational profile data of the vehicle can also be used. In one possible embodiment, this operational profile data are recorded and periodically stored in a data memory 19. In the case of the embodiment illustrated in FIG. 1A, the controller 18 can read out these operational profile data in order to also take it into consideration during the calculation of the remaining duration and/or the remaining distance to be expected until the charging station is reached.

In the case of one possible embodiment, the controller 18 monitors the current state of charge and an operating temperature T of the vehicle battery 2. In the case of one possible embodiment, the controller 18 can activate the cooling circuit 21 in terms of the heat currents to be expected until the charging station is reached such that, upon reaching the charging station, the operating temperature T of the vehicle battery 2 monitored thereby corresponds to the desired charging start temperature $T_0$. For this purpose, in the case of a further possible embodiment the controller 18 can additionally use a battery heater 15 provided in the vehicle battery 2, as also illustrated in FIG. 2. Therefore, in the case of one possible embodiment, the controller 18 controls both the cooling circuit 21 for activating its pump 3 and a battery heater 15 in terms of the heat currents to be expected until the charging station is reached such that, upon reaching the charging station, the operating temperature T of the vehicle battery 2 monitored by the controller 18 corresponds to the desired charging start temperature $T_0$, e.g. a desired charging temperature $T_0$ of about 20° C.

In the case of one possible embodiment, the vehicle battery 2 can be located in a thermally insulated installation space within the vehicle which is cooled by means of the fluid F circulating within the cooling circuit 21. As can be seen in FIG. 1A, the cooling circuit 21 has a cooling reservoir or a tank 1 for holding a specified quantity of the fluid F, and the pump 3, which can be activated by the controller 18, for pumping the fluid F through the installation space of the vehicle battery 2. In the case of a preferred embodiment, the quantity m of the fluid F within the tank 1 is dimensioned such that it can, for the most part, absorb the heat quantity Q accumulating during the electrical charging procedure of the vehicle battery 2. The dimensioning of the quantity m of the fluid F is such that the fluid quantity m is large enough in order to also cool the vehicle battery 2 of the vehicle effectively without external cooling. In the case of a preferred embodiment, the fluid F located in the tank 1 of the cooling circuit 21 is pre-cooled prior to the beginning of the electrical charging procedure by the system SYS to a low temperature and at the beginning of the electrical charging procedure the fluid F is pumped by means of the pump 3 through the installation space of the vehicle battery 2.

In order not to cool cells of the vehicle battery 2 excessively at the beginning of the charging procedure, the heated return of the vehicle battery 2 can be mixed with the fluid F from the tank 1 via a controllable mixing valve 25. A significant advantage of the admixing is that the minimum temperature for the fluid F in the tank 1 can be selected to be considerably lower and therefore more negative thermal energy can be provisioned per unit of weight/volume. FIG. 1B shows an embodiment comprising a mixing valve 25 which can be controlled by the controller 18.

In the case of one possible embodiment, the waste heat produced during the electrical charging procedure of the vehicle battery 2 can be used additionally for controlling the temperature of a passenger compartment and/or other vehicle components of the vehicle. In the case of one possible embodiment, the waste heat produced during the electrical charging procedure of the vehicle battery 2 is intermediately stored via a heat pump, which is coupled to the cooling circuit 21, in a heat accumulator of a high temperature circuit 22. In the case of a preferred embodiment of the system SYS in accordance with the invention, the quantity m of the fluid F circulating within the cooling circuit 21 is dimensioned such that a maximum permissible temperature of the vehicle battery 2 is not reached during an electrical charging of the vehicle battery 2 from about 10% of its battery charging capacity at the beginning of the electrical charging procedure to about 80% of its battery charging capacity at the end of the electrical charging procedure. In order to adjust the cooling power provided by the cooling circuit 21, the controller 18 can activate the power of a fluid pump 3 contained in the cooling circuit 21, and/or of a compressor 5 contained in a heat pump.

FIG. 2 shows a block diagram to illustrate an exemplified embodiment of the inventive system SYS for regulating a charging temperature T of a vehicle battery 2 of a vehicle. The vehicle battery 2 is located in the cooling circuit 21 which has at least one cooling reservoir or at least one tank 1 for holding a cooling fluid F. The vehicle battery 2 is cooled by means of the fluid F which circulates, in a manner driven by the pump 3, in the cooling circuit 21 of the vehicle. The controller 18 illustrated in FIG. 2 controls, inter alia, the pump 3 e.g. by means of control signals CRTL. The fluid F circulating in the cooling circuit 21 is controlled by the controller 18 with the aid of the pump 3 such that, upon reaching an electrical charging station, the temperature of the vehicle battery 2 is already pre-controlled to a desired charging start temperature $T_0$ which is particularly suitable for an electrical charging procedure of the relevant vehicle battery 2 for speedily charging the vehicle battery 2 by means of the charging station. In the case of one possible embodiment, the vehicle battery 2 is installed in a thermally well insulated installation space within the vehicle. This installation space can be cooled or heated by means of the fluid F. The cooling reservoir or the tank 1 contains a relatively large quantity of fluid F. The quantity m of the fluid F present in the tank 1 far exceeds the quantity of fluid present in a conventional cooling circuit of a conventional system. For example, the quantity m of the fluid F circulating in the cooling circuit 21 exceeds the quantity of a fluid, circulating in a conventional cooling circuit, by a factor of 10. In the case of a preferred embodiment, the fluid F provided in the cooling circuit 21 has a relatively high specific heat capacity. In the case of a preferred embodiment, the fluid F is formed by a liquid having a high specific thermal coefficient, e.g. by water or by an aqueous alcohol solution. The liquid or the fluid F can flow by means of the pump 3 via a line system through the vehicle battery 2 installed in the vehicle and so heat is exchanged between the fluid F and the vehicle battery 2.

The heat output produced during charging of the vehicle battery 2.

$$P_{thermal} = \text{internal resistance } R * \text{current } I^2$$

heats the vehicle battery 2 according to the specific heat capacity and mass thereof.

If, during the charging procedure, a fluid F is circulated through the vehicle battery 2, the value of the specific heat capacity increases accordingly by the heat capacity of the fluid F.

$$c_{System} = \frac{c_{Battery} * Mass_{Battery} + c_{Fluid} * Mass_{Fluid}}{Mass_{Battery} + Mass_{Fluid}}$$

The thermal energy which the system can absorb is thus derived from the heat capacity and the permissible temperature difference as well as from the energy output to the environment during the electrical charging procedure. It is increased if the fluid F and/or the vehicle battery 2 is actively cooled down prior to the charging procedure. In order not to attenuate the power of the vehicle battery 2 which decreases greatly below a given temperature, the fluid F is preferably pre-cooled, without already flowing through the vehicle battery 2. Depending upon the waste heat to be absorbed, prior to the electrical charging procedure the vehicle battery 2 can be brought to a temperature which is at the lower end of the power output required for the driving operation of the vehicle.

After connecting the vehicle battery 2 to the charging station, at the start of the charging procedure the pre-cooled fluid F located in the tank 1 is pumped from the tank 1 through the vehicle battery 2 with the aid of the pump 3 of the cooling circuit 21 in a manner controlled by the controller 18. The vehicle battery 2 can be connected to an external charging station via an electrical charging cable. As soon as the electrical charging procedure of the vehicle battery 2 begins, i.e. as soon as an electrical charging current flows, the pumping procedure is automatically started by the pump 3. The fluid quantity m of the fluid F present in the cooling circuit 21 is preferably dimensioned such that, during an electrical charging of the vehicle battery 2 from about 10% of its total capacity during the start of the charging procedure to 80% of its total capacity at the end of the charging procedure, the maximum permissible temperature of the vehicle battery 2 is not yet completely reached and therefore a reserve remains for possible peaks in the driving operation.

In the design, shown in the modification, according to FIG. 1B, the fluid F is continuously or discontinuously circulated. By opening or closing the mixing valve 25, a define quantity of the cooler fluid F from the cooling reservoir 1 is admixed with the circulating fluid F and thus the desired temperature is adjusted for the inflow of the fluid F into the vehicle battery 2.

Typically, the average load during the driving operation is considerably below the load during the rapid charging or the charging procedure. In the case of the embodiment illustrated in FIG. 2, the controller 18 obtains navigation data from a navigation unit 20 of the vehicle and has access to operational profile data of the vehicle which can be intermediately stored in a data memory 19.

In the case of the embodiment of the system in accordance with the invention illustrated in FIG. 2, the cooling circuit 21 is coupled to a high temperature circuit 22 via a heat pump 4. The waste heat produced during the electrical charging procedure of the vehicle battery 2 is intermediately stored in a heat accumulator 13 of the high temperature circuit 22 of a drive train 9 of the vehicle via the heat pump 4 which is coupled to the cooling circuit 21. In the case of the exemplified embodiment illustrated in FIG. 2, the heat pump or cooling unit 4 contains a cooling compressor 5 and a diffuser 6. On both sides, the heat pump 4 or the cooling unit 4 has a heat exchanger. Located on sides of the cooling circuit 21 is a heat exchanger 8 and located on sides of the high temperature circuit 22 is a heat exchanger 7, as illustrated in FIG. 2. Controllable valves 23, 24 can be provided within the heat pump 4. The high temperature circuit 22 of the vehicle contains a pump 12, which can be activated by the controller 18, for pumping a fluid F through the drive train 9 of the electric vehicle and through the heat accumulator 13 of the high temperature circuit 22, as illustrated in FIG. 2. Furthermore, the fluid F' in the high temperature circuit 22 is pumped through heating devices for a passenger compartment of the vehicle and for other vehicle components of the vehicle. In the case of the exemplified embodiment illustrated in FIG. 2, the high temperature circuit 22 has a cooler 10 and a fan 11 with a cooler motor which is connected to the cooler 10 and cools the circulating fluid F' with the aid of ambient air.

Furthermore, a slide valve 17 can be provided for controlling the outlet air for the passenger compartment. Optionally, an additional electrical heater 14 can be provided, as illustrated in FIG. 2. Furthermore, in the case of the embodiment illustrated in FIG. 2, an AC-cooler 16 can be provided for air-conditioning of the passenger compartment and can be connected to the heat pump 4.

During a rapid electrical charging procedure of the vehicle battery 2 with 200 kW direct current power and a high current amplitude, more than 4 kWh thermal energy can be produced within several minutes. Without a temperature sink or active cooling, the operating temperature T of a vehicle battery 2 weighing e.g. more than 300 kg would rise by ca. 20° C. and thus increase over the permissible range for most cell types. A vehicle battery 2 with ca. 40 kg additional aqueous fluid F as the temperature sink heats up by less than 25° C. With a start temperature of about 20° C., e.g. 17° C., the vehicle battery 2 reaches an operating temperature T of less than 45° C., e.g. 40° C., at the end of the electrical charging procedure. The heat energy of ca. 3 to 6 kWh which is stored in the temperature sink can be used over the predicted time period with the aid of a heat pump 4 in order to considerably improve the range of the vehicle, in particular in a colder environment, e.g. at a colder time of the year. If the heat had to be generated from an electrically stored energy, this would consume ca. 15% of the usable energy of the vehicle battery.

If heat is not required in the passenger compartment of the vehicle, the heat energy can be output via the cooling circuit 21 to the surrounding area during the driving operation of the vehicle. In order to increase the cooling power, the heat pump 4 can be used with its compressor 5 and its diffuser 6 and the two heat exchangers 7, 8. This is particularly expedient when a further cooling circuit, namely the high temperature cooling circuit 22, having a dedicated cooler 10, fan 11 and pump 12 is already provided or present for inverters and drive motors of the drive train 9 with a higher temperature level.

For this purpose, in the case of one possible embodiment a cooling agent is circulated via the compressor 5 and the diffuser 6 of the heat pump 4 such that the fluid F outputs its heat energy and a heat accumulator 13 of the high temperature circuit 22 is heated. The heat pump or cooling unit 4 can also be used for cooling the passenger compartment of the vehicle with the aid of the AC-cooler 16. The valves 23, 24 and the cooling compressor 5 can regulate the cooling power between the fluid F and the vehicle battery 2 and also in the passenger compartment of the vehicle. If heat is required in the passenger compartment, the stored heat energy can also be used during the driving operation for the purpose of controlling the temperature of the passenger compartment. Ideally, the heat pump 4 is used for this purpose in order to increase the efficiency and reach a higher temperature level. The system can be supplemented by additional heaters 14, 15 if the heat energy stored during the charging procedure is not sufficient for controlling the temperature of the passenger compartment completely or the vehicle battery 2 is at risk of cooling below a permissible minimum temperature.

In the case of one possible embodiment, the regulation of the system SYS is adapted to the requirements for controlling the temperature of the passenger compartment and to the requirements for preparing the next electrical charging procedure for charging the vehicle battery 2. If e.g. the state of charge of the vehicle battery 2, which is monitored by the controller 18 using sensors, reaches a minimum state of e.g. below 25% of the battery capacity, the inventive system SYS takes measures to prepare an forthcoming rapid charging procedure for charging the vehicle battery 2. Moreover, in addition to the monitored state of charge of the vehicle battery 2, information or data from the navigation system or the navigation unit 20 can be taken into consideration. Furthermore, the distance of the vehicle from the charging stations located in the surrounding area can also be processed. Furthermore, information from the previous driving behaviour of the user can be taken into consideration in order, additionally, to estimate the average power output until the charging station is reached and until the beginning of the charging procedure. With the available information or data provided by the navigation unit 20, and on the basis of the operational profile data of the vehicle reflecting the driving behaviour of the user of the vehicle, the expected remaining duration and/or the expected remaining distance until the charging station is reached can be calculated by the calculation unit of the controller 18. With this information and the actual temperature or operating temperature T of the vehicle battery 2 of the fluid F located in the tank 1 and the actual temperature of the surrounding area, in the case of one possible embodiment the probable temperature of the vehicle battery 2 upon reaching the charging station is calculated by the calculation unit of the controller 18. By actively cooling the fluid F located in the tank 1 and by controlling the pump volume provided by the pump 3, the temperature of the vehicle battery 2 and of the fluid F is lowered by the controller 18 to an optimum desired charging start temperature $T_0$ at the start of the rapid charging procedure. In the case of one possible embodiment, the outside temperature and the usage behaviour of the vehicle can also be taken into consideration when determining the average heat requirement for the passenger compartment. The navigation unit 20 can provide data regarding the ability to reach nearby charging stations. Furthermore, the navigation unit 20 can provide data in real time regarding the distance still to be travelled in order to reach the charging station. Operational profile data of the driver and/or of the vehicle can be read out from the data memory 19. In the case of one possible embodiment, the waste heat of the drive train 9, i.e. of the motor and the inverter, and the discharging procedure can provide further heat quantities in dependence upon the average driving speed of the vehicle. The available heat quantity can be adjusted to the heat requirement. If the available heat quantity is greater than the heat requirement, it can be output to the surrounding area via the cooler and fan 10. In addition, the passenger compartment and the temperature sink can be cooled via the heat pump or the cooling unit 4. In contrast thereto, if the heat requirement is greater than the available heat energy, the stored heat energy of the temperature sink, in particular of the fluid F and the vehicle battery 2, is initially used in order to be able to provide supplementary heating by means of electrical energy.

Figure 3:
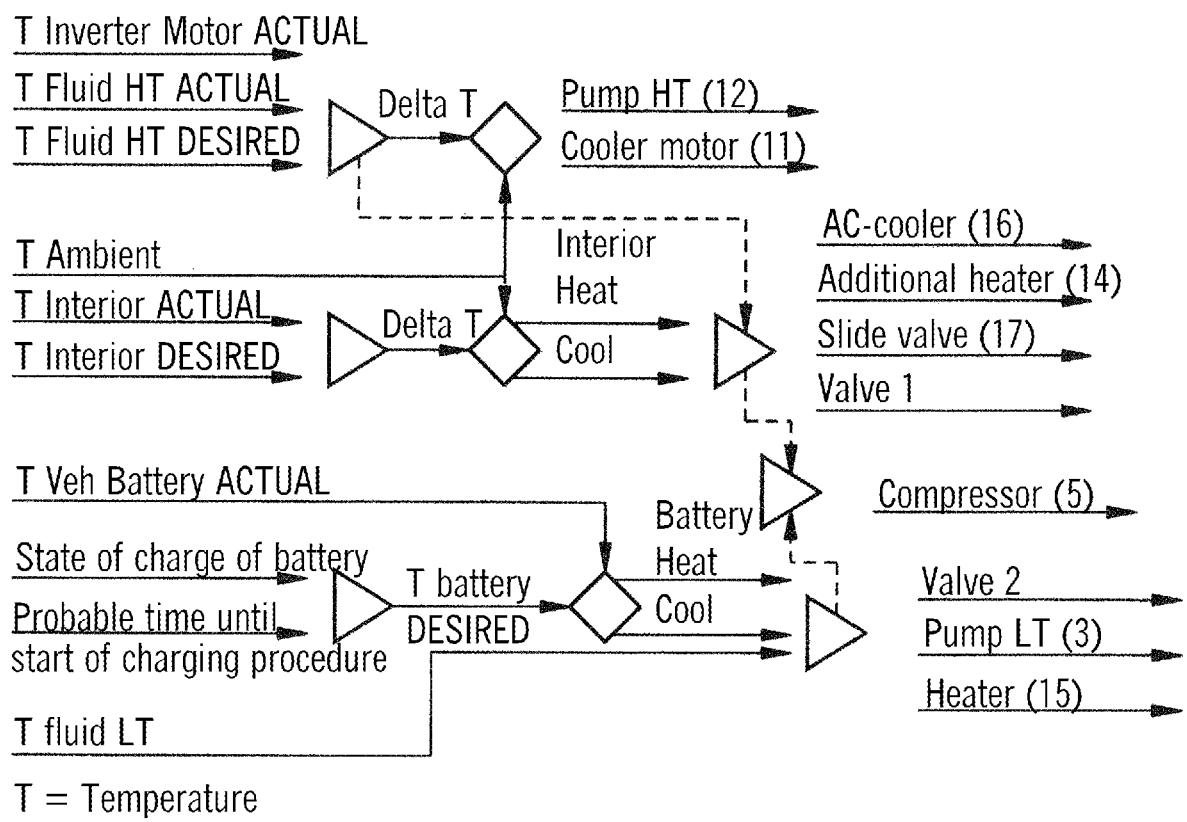
FIG. 3 shows a diagram to explain the mode of operation of one example of an embodiment of a controller which can be used within the system in accordance with the invention.

FIG. 3 schematically shows one possible example of an embodiment of a controller 18 of the inventive regulation system SYS. FIG. 3 shows, on one side, the input signals, in particular sensor signals and, on the output-side, possible control signals CRTL for components of the system. In one possible embodiment, the controller 18 obtains, on the input-side, e.g. the actual or operating temperature of the drive train 9, in particular the electric motor contained therein. Furthermore, an actual temperature and a desired temperature of the fluid F circulating in the high temperature circuit 22 is detected and communicated to the controller 18. A sensor connected to the controller 18 can measure the ambient temperature of the vehicle. Furthermore, the interior or passenger compartment of the vehicle can be provided with temperature sensors which provide an actual temperature of the interior. Furthermore, a user has the option of setting a desired temperature of the interior via a setting unit.

Furthermore, the controller 18 uses sensors to monitor the actual temperature of the vehicle battery 2. Furthermore, the instantaneous state of charge of the vehicle battery 2 is communicated to the controller 18. Furthermore, the controller 18 additionally obtains data or information regarding the probable time until the start of the electrical charging procedure of the vehicle battery 2. Furthermore, the controller 18 obtains temperature data regarding the temperature of the fluid F circulating in the cooling circuit 21.

In the case of the exemplified embodiment illustrated in FIG. 3, the controller 18 contains a comparator which compares the actual temperature of the fluid F circulating in the high temperature circuit 22 with a settable desired temperature. In dependence upon the temperature deviation, the pump 12 of the high temperature circuit 22 and the cooler motor 11 can be activated by the controller 18.

Furthermore, the controller 18 can contain a comparator which compares the measured interior temperature to the measured desired temperature and heats or cools the interior of the vehicle in dependence upon the temperature difference. In order to heat or cool the interior, the AC-cooler 16, the additional electrical heater 14, the slide valve 17 and/or the valve 23 of the cooling pump 24 can be activated by the controller 18. Furthermore, it is possible to activate the compressor 5 of the heat pump 4 or cooling unit 4.

Furthermore, the controller 18 can evaluate the instantaneous state of charge of the vehicle battery 2 and the time probably remaining until the beginning of the electrical charging procedure in order to determine a desired operating temperature T of the vehicle battery 2. This desired temperature T of the vehicle battery 2 is compared to the measured instantaneous vehicle battery 2 by the controller 18 in order to establish whether the vehicle battery 2 has to be heated up or cooled. The temperature of the vehicle battery 2 is pre-controlled by the controller 18 such that, upon reaching the charging station, the temperature thereof is pre-controlled to a specific desired charging start temperature $T_0$. Depending upon the design and chemical composition of the vehicle battery 2, this desired charging start temperature $T_0$ is particularly suitable particularly for an electrical charging procedure for speedily charging the vehicle battery 2 by means of the charging station. For example, the desired charging start temperature $T_0$ is about 20° C. In the case of one possible embodiment, in order to reach this desired charging start temperature $T_0$, the controller 18 activates the second valve 24 of the heat pump or the cooling unit 4 and/or the pump 3 of the cooling circuit 21 in order to reach the desired charging start temperature $T_0$. Furthermore, in the case of one possible embodiment, the controller 18 activates the electrical vehicle battery heater 15 in order to still reach the desired charging start temperature $T_0$ in good time upon reaching the charging station, in particular if the temperature of the vehicle battery 2 and/or the temperature of the fluid F within the cooling circuit 21 is considerably lower than the desired charging start temperature $T_0$ to be reached.

The controller 18 of the system SYS performs a regulating procedure in order to speed up the electrical charging procedure of the vehicle battery 2 and/or to optimise the range of the vehicle by means of the temperature sink. The time to be expected until the electrical rapid charging procedure can be determined from the operational profile and/or the navigation data. The heat currents are determined e.g. from the actual temperature of the components and the heat capacity thereof. Furthermore, in order to determine the heat currents the waste heat of the drive train 9 and the heat requirement of the interior can be taken into consideration. Furthermore, the possible cooling power into the surrounding area can be used for determining the heat currents.

The regulation can determine or calculate a temperature time profile of the vehicle battery 2 whilst preserving the vehicle range in an optimum manner. In the case of one possible embodiment, a temperature sensor can be provided on the vehicle battery 2. In the case of one possible embodiment variant, if the temperature of the vehicle battery 2 falls below a permissible value, a warning signal is generated. Furthermore, if the temperature of the battery 2 falls below a threshold value, the additional electric heater for the vehicle battery 2 is switched on or activated. In the case of one possible embodiment, additional electrical units of consumption can be communicated to the controller 18 for the purpose of calculating the range.

In the case of one possible embodiment, if the temperature of the vehicle battery 2 rises above a permissible critical temperature value, the controller 18 can likewise generate a warning signal which prompts e.g. the driver of the vehicle to park the vehicle. Moreover, in the event of an increase in temperature to the permissible critical temperature value, all non-necessary electrical consumers can be switched off automatically by the controller 18 and maximum cooling of the vehicle battery 2 can be initiated.

In the case of one possible embodiment, if the temperature of the vehicle battery 2 rises above a desired value which, however, is still non-critical, the cooling power in the cooling circuit or low temperature circuit 21 is increased by the controller 18. For this purpose, the pumping power of the activated pump 3 can be increased and at the same time the compressor 5 of the cooling unit or heat pump 4 can be controlled such that it provides more power. Furthermore, the valve 24 of the heat pump or cooling unit 4 is opened. Moreover, if the cooling power is not sufficient the valve 23 is restricted by the controller 18. If the high temperature circuit 22 is overheated, the power of the fan 11 and the pump 12 can be increased.

If the temperature of the vehicle battery 2 falls below the desired value but is not critical, the pumping power of the pump 3 is reduced by the controller 18. Moreover, if cooling power is required in the interior, the valve 23 can be opened. At the same time, the valve 24 is restricted by the controller 18. Furthermore, the compressor 5 can be switched to less power.

FIG. 4 shows an application example of the inventive system and the inventive method for regulating a charging temperature of a vehicle battery 2 of a vehicle according to the invention. In the illustrated example, the vehicle battery 2 at time 06:00 am (e.g. at the beginning of a working shift) a state of charge SOC of about 30 kWh. The charge stored in the vehicle battery 2 initially decreases rapidly during a journey by the vehicle to a distribution area of the service provision because the journey to the distribution area or destination area of the service provision is performed speedily and additional electrical consumers, such as e.g. a heater, require more electrical energy. Upon reaching the distribution area e.g. of the area of operation of a taxis, the electrical consumptions flattens somewhat, as illustrated in FIG. 4, because during the provision of service the vehicle is either parked or is moving only slowly in road traffic within a city.

The temperature of the vehicle battery 2 increases initially from 35° C. to 40° C., as illustrated in FIG. 4, by reason of the high electrical consumption during the approach to the distribution area. In the distribution area, the heat can utilise the residual heat of the vehicle battery 2 in order to heat the interior of the vehicle e.g. by means of the heat pump 4. The waste heat from the drive train 9 is not sufficient during the service phase to cover the heat requirement completely.

In the case of the illustrated application example, the system SYS for regulating the charging temperature of the vehicle battery 2 recognises that at the latest at 10:00 am a charging procedure for charging the vehicle battery 2 is pending. In the case of a charging power of 200 kW and an energy volume of e.g. 35 kWh, the vehicle battery 2 including the fluid F located in the temperature sink will heat up by 20 to 25° C. in the illustrated example. In order to ensure an optimum charging procedure, the temperature of the vehicle battery 2 is controlled by the controller 18 such that at 10:00 am, i.e. at the expected beginning of the electrical charging procedure, the vehicle battery will reach a desired charging start temperature $T_0$ of e.g. 17° C. Where desired, the waste heat is made available for the interior of the vehicle. If no heat is required in the interior at that moment, the waste heat can be output to the high temperature circuit 22 via the heat pump 4.

In the case of the example illustrated in FIG. 4, at approximately 10:00 am the vehicle battery 2 reaches a state of charge of about 5 kWh and can be rapidly charged. For this purpose, the vehicle battery 2 and the fluid F of the temperature sink or the cooling circuit 21 are heated by about 23° C. to 40° C. in the illustrated example. Since the fluid quantity m of the fluid F can be adjusted relatively easily by dimensioning the tank volume of the tank 1, individual heat capacities can be set relatively easily for the battery temperature sink unit.

After an approximately 15 minute charging pause, in which the vehicle battery 2 is electrically charged at the charging station, the logistics service can then be resumed e.g. at 10:15 am. In this example, a further rapid charging procedure at the end of the shift is sufficient in order to be able to hand over the vehicle ready for operation and charged to another colleague of the logistics service, e.g. taxi service.

With the system and method in accordance with the invention, by means of a temperature sink the range of the vehicle is optimised and the charging procedure for charging the vehicle battery 2 is sped up, e.g. to a charging time of less than 15 minutes. The various parameters of the regulation system depend, on the one hand, upon the structural and chemical properties of the vehicle battery 2 and, on the other hand, upon adjustable desired values. For example, the vehicle battery 2 can have a battery capacity of 40 kWh for urban traffic. The usable capacity in a range of 10 to 80% is e.g. 28 kWh. The vehicle battery 2 can be operated at a voltage of 300 V and have a mass per kilowatt hour of 9.5 kg per kilowatt hour. The internal resistance of the vehicle battery 2 can likewise differ depending upon the type of battery and has e.g. an internal resistance of about 70 mOhm.

In the case of one possible embodiment, the desired charging start temperature $T_0$ at the beginning of the charging procedure is about 20° C., e.g. 17° C., as in the example illustrated in FIG. 4. The temperature at the end of the charging procedure is e.g. preferably about 50° C. The discharging and charging power of the vehicle battery 2 can vary depending upon the type of battery. For example, the average discharging power is 6.25 kW and the average charging power is 200 kW. The charging and discharging current can be different from type to type. In the case of one possible embodiment, the average charging current is 667 amp and the average discharging current is 21 amp.

The heat capacity, e.g. for the battery cells, is 0.18 Wh/kg*K with a possible mass of 380 kg. The heat capacity of the cooling fluid, in particular water, is e.g. 1.16 Wh/kg*K with a mass of e.g. about 30 kg. The heat capacity of the aluminium is e.g. 0.24 Wh/kg*K with a mass of 76 kg. Therefore, in the case of one possible embodiment the total mass is 1.0 about 486 kg.

In the case of one possible embodiment, the temperature difference for charging the vehicle battery 2 per hour is 248 K/h. In the case of one possible embodiment, the required charging time for charging from 10% to 80% of the battery capacity is 0.14 h. The temperature difference produced during charging of the vehicle battery 2 is e.g. about 35 K. In the case of one possible embodiment variant, the total storable thermal energy is about 4.4 kWh.

Further embodiment variants of the regulation system in accordance with the invention are possible. In the case of one possible embodiment, the volume of the cooling reservoir or the tank 1 can be varied for use of various vehicle battery types of the vehicle battery 2. In the case of a further possible embodiment variant, the cooling reservoir container or the tank 1 within the cooling circuit 21 can be replaced and/or the volume thereof can be set for various applications, in particular various vehicle battery types of the vehicle battery 2 and/or of the electric vehicle. In a further embodiment, the battery is configured such that the fluid can be stored completely between the cells of the battery. In the case of a further possible embodiment, the controller 18 provides additional information to the driver of the vehicle via a user interface. For example, the driver obtains information regarding the distance still remaining and the remaining duration to be expected until the charging station is reached. Furthermore, a temperature profile and/or charging profile can be indicated to the driver or user, as illustrated e.g. in FIG. 4.

In the case of a further possible embodiment, the calculation unit of the controller 18 can determine various possible reachable charging stations in the urban area and select a most suitable charging station corresponding to a staffing system and/or handover time. In the case of this embodiment, the service schedule or shift schedule can specify a desired time at which a charging station is to be reached. Moreover, upon reaching the charging station the temperature of the vehicle battery 2 is to correspond to a specific desired charging start temperature $T_0$. The system and method in accordance with the invention are suitable for regulating the charging temperature of any vehicle batteries of electric vehicles. These electric vehicles are electric vehicles which are used in road traffic. The system in accordance with the invention is suitable in particular for vehicles which are used in the field of logistics or in the provision of transport services. The vehicles can be not only road vehicles but also electrically operated water craft. The cooling fluid F is preferably a liquid, in particular water. Alternatively, a cooling gas or a gas mixture can also be used for cooling purposes.

The invention claimed is:

1. A system for regulating a charging temperature of a vehicle battery of a vehicle at a charging station, comprising:
    a cooling circuit in the vehicle configured to cool the vehicle battery only by means of a fluid which circulates in the cooling circuit of the vehicle which is controlled by; and
    a controller configured and operable to control said cooling circuit such that, upon reaching the charging station, the temperature of the vehicle battery is pre-controlled to a desired charging start temperature which is suitable for an electrical charging procedure for speedily charging the vehicle battery by means of the charging station, wherein a quantity of the fluid circulating within the cooling circuit is dimensioned such that, without external cooling a maximum permissible temperature of the vehicle battery is not reached during an electrical charging of the vehicle battery from 10% of its battery charging capacity at the beginning of the electrical charging procedure to 80% of its battery charging capacity at the end of the electrical charging procedure.

2. The system as claimed in claim 1, wherein the controller is configured and operable to determine an expected remaining duration and/or remaining distance until the charging station is reached and any resulting heat currents, to be expected, of vehicle components of the vehicle until the vehicle reaches the charging station.

3. The system as claimed in claim 2, wherein the controller is configured and operable to calculate the expected remaining duration and/or the expected remaining distance until the charging station is reached on the basis of navigation data provided by a navigation unit of the vehicle, and on the basis of operational profile data of the vehicle.

4. The system as claimed in claim 3, wherein the operational profile data of the vehicle are recorded and periodically stored in a data memory.

5. The system as claimed in claim 1, wherein the controller is configured and operable to monitor a current state of charge and an operating temperature of the vehicle battery.

6. The system as claimed in claim 2, wherein the controller is configured and operable to activate the cooling circuit and/or a battery heater provided on the vehicle battery in terms of the heat currents to be expected until the charging station is reached such that the monitored operating temperature of the vehicle battery on reaching the charging station corresponds to the desired charging start temperature.

7. The system as claimed in claim 1, wherein further comprising a thermally insulated installation space in which the vehicle battery is installed in a thermally insulated installation space within the vehicle, wherein said space which is cooled by means of the fluid circulating within the cooling circuit.

8. The system as claimed in claim 1, wherein the cooling circuit has a tank for holding a specified quantity of the fluid and a pump, which can be controlled by the controller, for pumping the fluid through an installation space of the vehicle battery, wherein the quantity of the fluid within the tank can absorb a proportion of the heat energy accumulating during the electrical charging procedure of the vehicle battery.

9. The system as claimed in claim 8, wherein the fluid located in the tank of the cooling circuit is pre-cooled prior to the beginning of the electrical charging procedure to a low temperature and at the beginning of the electrical charging procedure is pumped by means of the pump through the installation space of the vehicle battery.

10. The system as claimed in claim 1, wherein a heated return from the vehicle battery can be admixed with the fluid flowing out of the tank via a controllable mixing valve controlled by said controller.

11. The system as claimed in claim 1, wherein the controller is configured and operable to set for setting the cooling power provided by the cooling circuit activates by activating the power of a pump contained in the cooling circuit and/or a compressor contained in a heat pump.

12. A method for regulating a charging temperature of a vehicle battery of a vehicle, wherein the vehicle battery is cooled by means of a fluid which circulates in a cooling circuit of the vehicle which is controlled such that, upon reaching a charging station, the temperature of the vehicle battery is pre-controlled to a desired charging start temperature which is suitable for an electrical charging procedure for speedily charging the vehicle battery by means of the charging station, wherein a quantity of the fluid circulating within the cooling circuit is dimensioned such that, without external cooling, a maximum permissible temperature of the vehicle battery is not reached during an electrical charging of the vehicle battery from 10% of its battery charging capacity at the beginning of the electrical charging procedure to 80% of its battery charging capacity at the end of the electrical charging procedure.

13. The method as claimed in claim 12, wherein the fluid located in a tank of the cooling circuit is pre-cooled prior to the beginning of the electrical charging procedure to a low temperature and at the beginning of the electrical charging procedure the fluid is pumped by means of the pump through an installation space of the vehicle battery.

14. The method as claimed in claim 13, wherein a heated return from the vehicle battery is admixed with the fluid flowing out of the tank via a controllable mixing valve.

* * * * *